United States Patent [19]

Akao

[11] Patent Number: 4,708,896
[45] Date of Patent: Nov. 24, 1987

[54] EASILY OPENABLE PACKAGING MATERIAL FOR PHOTOGRAPHIC PHOTOSENSITIVE MATERIALS

[75] Inventor: Mutsuo Akao, Kanagawa, Japan

[73] Assignee: Fuji Photo Film Co., Ltd., Ashigara, Japan

[21] Appl. No.: 897,788

[22] Filed: Aug. 19, 1986

[30] Foreign Application Priority Data

Aug. 19, 1985 [JP] Japan .............................. 60-125687[U]

[51] Int. Cl.$^4$ ...................... B65D 35/08; B32B 27/00
[52] U.S. Cl. ................................. 428/35; 428/220;
428/347; 428/349; 428/480; 428/516;
428/537.5
[58] Field of Search ................. 428/349, 461, 35, 220,
428/537.5, 500, 516, 480, 347

[56] References Cited

U.S. PATENT DOCUMENTS

| | | | |
|---|---|---|---|
| 4,070,398 | 1/1978 | Lu | 428/349 |
| 4,337,285 | 6/1982 | Akao et al. | 428/349 |
| 4,387,126 | 6/1983 | Rebholz et al. | 428/461 |
| 4,394,474 | 7/1983 | McKinney et al. | 524/232 |
| 4,452,846 | 6/1984 | Akao | 428/461 |
| 4,533,576 | 8/1985 | Tanahashi et al. | 428/461 |
| 4,554,210 | 11/1985 | Long et al. | 428/349 |
| 4,579,781 | 4/1986 | Akao | 428/461 |

*Primary Examiner*—Edith Buffalow
*Attorney, Agent, or Firm*—Burns, Doane, Swecker & Mathis

[57] ABSTRACT

An easily openable packaging material for photographic photosensitive materials which comprises, a light-shielding heat-sealable film layer containing a lubricant, a light-shielding material and more than 50 wt. % of a high-pressure low-density polyethylene resin and being located as the inner layer, an aluminum foil layer which is laminated on the above heat-sealable film layer with a delamination resistance of greater than 400 g/15 mm width and on the heat-sealable film layer side of which an anchor coat layer is formed and, a heat-resistant flexible sheet layer which is laminated on the above aluminum foil layer and of which heat resistance is higher than the above heat-sealable film layer by 5° C. or more.

This packaging material can easily be torn by hand without a notch.

9 Claims, 7 Drawing Figures

EASILY OPENABLE PACKAGING MATERIAL FOR PHOTOGRAPHIC PHOTOSENSITIVE MATERIALS

BACKGROUND OF THE INVENTION

1. Field of the Invention

This invention relates to an easily openable for photographic photosensitive materials.

2. Description of Prior Art

Various types of packaging materials for photographic photosensitive materials have widely been put to practical use, and various properties are required according to their uses.

As the packaging materials for photographic photosensitive materials, it is necessary to have various properties. For example, light-shielding, moistureproof, and gas barrier properties, etc. are required in order to keep the quality of photosensitive materials, and physical strength such as breaking strength and impact puncture strength and heat sealing properties are required in order to prevent breakage during packaging and transportation. Furthermore, suitable tear strength capable of tearing easily by hand is required in order to open easily at the time of use.

Generally, it is difficult to satisfy these properties by a single material, and composite laminated films were used as the packaging materials for photographic photosensitive materials.

An example of conventional packaging materials which aim at easy openning, such as shown in FIG. 2, is disclosed in Japanese Utility Model KOKOKU No. 60-7172. In this packaging material, a ethylene-vinyl acetate copolymer layer 7 and a Mg-type ionomer layer 8 are provided between each contact surfaces of two packaging films 6, 6, and the film 6 is laminated by heat seal of the above two layers 7, 8 having a suitable separability. Easy openability of this packaging material depends on this separability.

Another example of conventional packaging materials for easy openning, such as shown in FIG. 3, is disclosed in Japanese Utility Model KOKAI Nos. 57-189845 and 57-189846. This packaging material is composed of a biaxially stretched film layer 9, a polyethylene, polypropylene or ionomer layer 10 and a saponified ethylene-vinyl acetate copolymer layer. Suitable tearability is obtained by adjusting thicknesses of the three layers.

Another example of conventional packaging materials is shown in FIG. 4. This packaging material is composed of a thermally resistant flexible sheet layer 4, aluminum foil layer 3a and a light-shielding low-density polyethylene layer 1a containing carbon black. They are laminated in this order, and an adhesive layer 5 is provided between each layers. As shown in FIG. 5, a conventional packaging material of FIG. 4 where the aluminum foil layer 3a is replaced by an uniaxially stretched film layer 12.

These conventional packaging materials had various defects as the easily openable packaging materials for photographic photosensitive materials.

In the case of the packaging material of FIG. 2, separability of the heat seal was acceptable, but openability by tear was poor. Furthermore, since this packaging material were not light-shielding nor antistatic, this packaging material was unsuitable as the packaging material for photographic photosensitive materials.

In the case of the packaging material of FIG. 3, creasing was not easy, and bag-making aptitude and packaging aptitude were inferior. Physical strength was insufficient, and this packaging material were not light-shielding, antistatic or moistureproof. Accordingly, this packaging material was unsuitable as the packaging material for photographic photosensitive materials.

In the case of the packaging material of FIG. 4, physical strength, light-shielding and moistureproofness were acceptable. However, even though a notch was provided, tearing by hand was not easy because of its strong tear strength. When a three-sided fin seal pouch having notches as shown in FIG. 7 was formed by using this packaging material, it was necessary to heat-seal the part 14 around the notch 13 was in order to secure light-shielding and moistureproofness. As a result, the photographic photosensitive material packaged was caught by the notched part 14, and it was not easily removed from the packaging material.

In the case of the packaging material of FIG. 5, tearability in the direction parallel to stretching axis of the uniaxially stretched film layer 12 was acceptable, but tearability in other directions was not acceptable. Accordingly, it was necessary to select the direction of the stretching axis in the prescribed direction at bag-making, and the cutting direction of web was limited. Occasional generation of pinholes at corners, expensiveness, occasional tears of the uniaxially stretched film at lamination and restriction of the blending amount of a light-shielding material into the uniaxially stretched film were also problems.

SUMMARY OF THE INVENTION

It is an object of the invention to provide an easily openable packaging material for photographic photosensitive materials capable of tearing easily in addition to possessing sufficient physical strength and light-proofness.

It is another object of the invention to provide an easily openable packaging material for photographic photosensitive materials capable of tearing irrespective of direction.

It is another object of the invention to provide an easily openable packaging material for photographic photosensitive materials which is superior in bag-making and packaging.

Such objects can be achieved by the easily openable packaging material for photographic photosensitive materials which comprises a light-shielding heat-sealable film layer containing a lubricant, a light-shielding material and more than 50 wt. % of a high-pressure low-density polyethylene resin and being located as the inner layer, an aluminum foil layer which is laminated on the above heat-sealable film layer with a delamination resistance of greater than 400 g/15 mm and on the heat-sealable film layer side of which an anchor coat layer is formed, and a heat-resistant flexible sheet layer which is laminated on the above aluminum foil layer and of which heat resistance is higher than the above heat-sealable film layer by 5° C. or more.

DETAILED DESCRIPTION OF THE INVENTION

Figure 1:
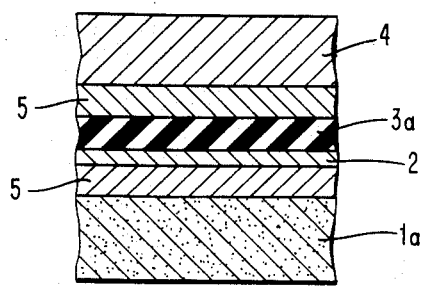
FIG. 1 is a sectional view of the most fundamental packaging material of the invention consisting of a light-shielding heat-sealable film layer 1a, an aluminum foil layer 3a on which an anchor coat layer 2 is provided and a heat-resistant flexible sheet layer 4. They are laminated in this order, and an adhesive layer 5 is provided between each layers.
Figure 2:
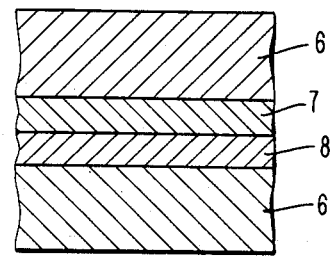
FIGS. 2 and 3 are sectional views of conventional packaging materials capable of opening easily.
Figure 3:
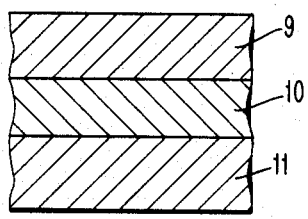

The light-shielding heat-sealable film layer comprises a lubricant, a light-shielding material and a high-pressure low-density polyethylene (LDPE).

The lubricant improves processing of the packaging material and insertion of the product. The lubricant prevents generation of static electricity during molding of film and packaging of photographic photosensitive products. It also prevents blocking of films and improves molding for T die extrusion or inflation processes. Suitable content of the lubricant is 0.01 to 1 wt. %. When the content is less than the above range, the above functions become insufficient. When the content is beyond the range, various defects appear. That is, heat sealing properties become inferior and excess lubricant adversely influences the packaged photosensitive materials (Development troubles happen.). The layer becomes sticky, and dust adheres to it. In another point of view, slipping angle of the heat-sealable film layer is preferably less than 20 degrees (static friction coefficient is smaller than 0.364). In terms of the influence on photosensitive materials and improvement of the foregoing properties including slipping character, silicone lubricants, fatty acid amide lubricants and fatty acid lubricants are preferable. The silicone lubricants include dimethylpolysiloxane. The fatty acid amide lubricants have a carbon number of 10 to 50, preferably 15 to 35, and it includes an alkylene bis fatty acid amide. Examples of such a fatty acid amide are oleic acid amide, erucic acid amide and stearic acid amide. Carbon number of the fatty acids is in the same range as the above case of the fatty acid amides.

Examples of commercial lubricants suitable for the present invention include;

Silicone lubricants; "SHINETSU SILICONE" (Shinetsu Chemical Co., Ltd.) "TORAY SILICONE" (Toray Silicone Co., Ltd.)

Oleic acid amide lubricants; "ARMOSLIP-CP" (Lion Akzo Co., Ltd.), "NEWTRON" and "NEWTRON E 18" (Nippon Fine Chemical Co., Ltd.), "AMIDE-O" Nitto Kagaku K.K.), "DIAMID O-200" and "DIAMID G-200" (Nippon Kasei Chemical Co., Ltd.)

Erucic acid amide lubricants; "ALFLOW P-10" Nippon Oil and Fats Co., Ltd.)

Stearic acid amide lubricants; "ALFLOW S-10" (Nippon Oil and Fats Co., Ltd.), "NEWTRON 2" (Nippon Fine Chemical Co., Ltd.), "DIAMID 200" (Nippon Kasei Chemical Co., Ltd.)

Bis fatty acid amide lubricants; "BISAMIDE" (Nitto kagaku K.K.), "DIAMID-200 BIS" (Nippon Kasei Chemical Co., Ltd.), "ARMOWAX-EBS" (Lion Akzo Co., Ltd.)

"ELECTROSTRIPPER" (Kao Corp.) is also preferable because it particularly improves slipping character and antistatic property, though it does not belong to the above classification.

The light-shielding material is used in order to secure light-shielding, antistatic property etc., and includes metal powder and carbon black.

As the metal powder, aluminum powder and its paste are preferable. The paste of aluminum powder is produced by adding mineral spirit and a small amount of a higher fatty acid such as stearic acid or oleic acid to form a paste at the production of aluminum powder according to a known method such as using a ball mill, a stamp mill or an atomizer. A polyolefin thermoplastic resin such as various polypropylene resins, various polyethylene resins, ethylene-vinyl acetate copolymer (EVA), ethylene-ethyl acrylate copolymer (EEA) and ethylene-acrylic acid copolymer (EAA) is kneaded together with this aluminum paste under heating, and volatile components mainly mineral spirit are removed by a vacuum pump. This product is used as aluminum paste compound resin or aluminum paste masterbatch resin.

The aluminum paste masterbatch resin is preferable because of eliminating bad smell and bad influence upon the photographic photosensitive materials.

The aluminum powder includes microflakes produced from aluminum foil which is crushed by a ball mill or a stamp mill, in addition to usual aluminum powder manufactured by atomization, dropping on a rotary disc or evaporation from melted aluminum. Since aluminum powder is unstable, it is stabilized by a known treatment. Production of metal flake is disclosed, for example, in U.S. Pat. No. 4,469,282 and Japanese Patent KOKOKU Nos. 37-6779 and 47-6718, and production of metal powder for blending with plastics is disclosed, for example, in Japanese Patent KOKAI No. 59-75931.

Carbon blacks are divided into gas black, oil furnace black, anthracene black, acetylene black, lamp black, vegetable black and animal black according to their origin. Among these, oil furnace carbon black is preferable in terms of light-shielding character, cost and improvement of properties. On the other hand, since acetylene black and Ketschen carbon black have an antistatic character, they are also preferable, though they are expensive. They may be blended to the oil furnace black in order to improve its character. Suitable pH of carbon black is at 5 to 9, particularly at 6 to 8, and suitable mean particle size is 10 to 120 mµ. Particularly, the oil furnace carbon black having pH 6 to 8 and mean particle size of 15 to 30 mµ is preferable. By using the carbon black of such pH and particle size, a packaging material having the following merits is obtained. That is, the occurrence of fogging is rare, increase or decrease of photosensitivity scarcely happens, light-shielding ability is large, and the lumps of carbon black and pinholes such as fish eyes are rarely generated.

As the method of blending metal powder or carbon black with the resin, powder blending method, paste blending method, wet blending method, compound coloring method and masterbatch method, etc. may be employed. Among them, the masterbatch method is preferable in points of cost and clear process. Various masterbatch methods are known, and any known method may be employed. Such a masterbatch method includes the method of dispersing carbon black into a polymer organic solvent solution to produce a masterbatch (Japanese Patent KOKOKU No. 40-26196) and the method of dispersing carbon black into polyethylene to produce a masterbatch (Japanese Patent KOKOKU No. 43-10362).

In this method, first, a masterbatch of LDPE is prepared by blending more than 2%, usually more than 10%, of carbon black with LDPE. Then, LDPE is added to this masterbatch so that carbon black content becomes a prescribed value. Instead of LDPE, other polyolefin resins such as EEA and EVA may also be employed. Metal powder may be blended similarly.

A light-shielding effect appears at 0.3 wt. %, clearly appears at 1 wt. %, and remarkably appears at more than 3 wt. %. While, lumps increase with increasing the amount of carbon black. When its content exceeds 30 wt. %, the lumps remarkably increases and pinholes also forms. As the packaging material for photosensitive materials, moistureproofness, flatness, strength of film surface, heat seal ability and contamination of a photosensitive article or material are also problems. Accordingly, when these problems are also taken into consideration, a suitable content of carbon black is in the range of 0.1 to 15 wt. %, and the range of 3 to 7 wt. % is particularly preferable.

Carbon black is blended in the layer so as to touch a photosensitive article or material to be packaged. By this location, the carbon black effectively shields light, it prevents the occurrence of blocking, it gives slipping character, and it exhibits antistatic properties.

When other light-shielding material is employed, suitable content is 0.1 to 15 wt. %. In the case of a stretched film, a suitable content is 0.1 to 7 wt. % and when the content is beyond 12 wt. %, fish eye problems and a lowering of physical strength happen. While, in the case of unstretched film, the content may be up to 15 wt. %.

The amount of metal powder and also carbon black blended into the film depends on the area. A suitable amount is in the range of 0.5 to 30 g/m$^2$, and preferable amount is 1.5 to 18 g/m$^2$.

Metal powder may be used together with carbon black, and in this case, total amount is adjusted to the above range.

By blending metal powder or carbon black, light-shielding, antistatic property, antiblocking, moisture proofing and physical strength are improved.

The content of LDPE in the light-shielding heat-sealable film layer is more than 50 wt. %. As other components of this layer, various polyolefin resins may be blended.

The thickness of the light-shielding heat-sealable film layer is in the range of 20 to 70 $\mu$m. When the thickness is thicker than 70 $\mu$m, tearability decreases. On the other hand, when the thickness is thinner than 20 $\mu$m, physical strength is insufficient.

On the light-shielding heat-sealable film layer side of the aluminum foil layer, an anchor coat layer is provided, and the aluminum foil layer is laminated on the light-shielding heat-sealable film layer.

Thickness of the aluminum foil layer is in the range of 5 to 30 $\mu$m.

The anchor coat layer is provided in order to adjust the delamination resistance between the aluminum foil layer and the light-shielding heat-sealable film layer. When anchor coat layer is provided, it is favorable that surface of the aluminum foil layer is first activated by a surface treatment such as corona discharge and then an anchor coating agent (or a primer coating agent) is applied on it. However, the anchor coating agent may directly be applied on the aluminum foil layer.

Representative examples of the anchor coating agent are as follows;

(1) Organic titanate anchor coating agent

Tetrapropyl titanate or tetraisobutyl titanate is used as the principal constituent, and tetrastearyl titanate is added as a hydrolysis-adjusting agent.

(2) Polyethyleneimine anchor coating agent

A relatively high polymer of ethyleneimine $-(CH_2-CH_2-NH)-_n$ is used. This agent is particularly preferable because its handling is easy and its pot life is long.

(3) Polyisocyanate anchor coating agent

One-component type; Polymer having isocyanate group alone

Two-component type; Combination of a polymer having isocianate group and a polyester having OH group A chemical reaction such as a crosslinking reaction occurs in both types, and an adhesive effect appears. Pot life is short, and this coating agent is expensive.

(4) Polyester and urethane anchor coating agent

Saturated polyester resin or urethane resin is dissolved in a solvent such as ethyl acetate or toluene.

Among these, the anchor coat agent of which the principal constituent is polyethyleneimine is preferable.

The anchor coat layer is preferably made extremely thin, and it may be formed by a known method such as solution applying or spray coating. By the anchor coat layer, the delamination resistance between the aluminum foil layer and the light-shielding heat-sealable film layer is adjusted to greater than 400 g/15 mm width.

Lamination of the aluminum foil layer on the light-shielding heat-sealable film layer may be carried out according to a conventional method such as a heat sealing (hot bar sealing, impulse heat sealing, supersonic welding, etc.), a method using an adhesive (wet laminating, dry laminating, hot melt laminating, extrusion laminating, etc.) and a co-extrusion method. The adhesive is able to adhere to both layers to be joined, and selected from a thermoplastic resin melting adhesives including a polyolefin adhesive, a hot melting type gum adhesive and a solution type adhesive. The polyolefin adhesives include a homopolymer and a copolymer of an olefin such as various polyethylenes, polypropylenes, polybutenes and ethylene-propylene copolymers and low-pressure linear low-density polyethylene (L-LDPE), a copolymer of an olefin and another monomer such as EVA, EEA, EAA, various ionomers ("SURLYN" Dupont, "Himiran" Mitsui Polychemicals Co., Ltd., etc.) and a graft copolymer. The solution type adhesives are divided into adhesives for wet lamination and adhesives for dry lamination. The adhesives for wet lamination are emulsion or latex. Examples of the emulsion-type adhesives are polyvinyl acetate emulsion, the emulsion of EVA, the emulsion of vinyl acetate-acrylic ester copolymer, the emulsion of vinyl acetate-maleic ester copolymer, the emulsion of acrylic copolymer and the emulsion of EAA. Examples of the latex-type adhesives are natural rubber latex, styrene-butadiene rubber latex, acrylonitrile-butadiene rubber latex and chloroprene rubber latex. An example of the adhesives for dry lamination is polyurethane adhesive. Adhesives for hot melt lamination where paraffin wax, microcrystalline wax, EVA, EEA, etc. are blended, pressure-sensitive adhesives and temperature-sensitive adhesives may also be employed. Melting point of the adhesive employed is preferably 5° C. lower than the melting point of the flexible sheet in order to laminate without bad influence upon the flexible sheet by a thermal melting adhesion.

The thickness of the adhesive layer formed by extrusion laminating using a thermoplastic resin is usually 7 to 100 μm, preferably 15 to 50 μm. However, the thickness is determined based upon cost, rate of application, thickness of the whole layer, and etc., and accordingly, the thickness is not limited to the above range.

The heat-resistant flexible sheet layer is laminated on the aluminum foil layer. The flexible sheet usable as this layer includes various thermoplastic resin films which may be unstretched, uniaxially stretched or biaxially stretched such as various polyethylene films, ethylene copolymer films, polypropylene films, polyvinyl chloride films, polyvinylidene chloride films, polyamide films, polycarbonate films, fluorocarbon polymer films, polyester films and their modified resin films. Various flexible sheets such as cellulose acetate film, cellophane, polyvinyl alcohol film, paper, nonwoven fabric, cross laminated porous fabric are also usable. As the outer surface layer of the packaging material for photographic photosensitive materials, bleached kraft paper, synthetic paper, nonwoven fabric, biaxially stretched polyester film and cellophane are preferable in terms of printability, physical strength and no pinhole problem.

The heat resistance of the heat-resistant flexible sheet layer is higher than the light-shielding heat-sealable film layer by 5° C. or more, and thermal influence at heat sealing is thereby reduced. Suitable thickness of the flexible sheet layer are different according to its material etc., and it is usually in the range of 7 to 100 μm. The flexible sheet layer may also be laminated by an usual method described previously.

Various additives may be added to one or more of the above layers. Examples of the additives are described below.

(1) Plasticizer; phthalic acid esters, glycol esters, fatty acid esters, phosphosic acid esters, etc.
(2) Stabilizer; lead compounds, cadmium compounds, zinc compounds, alkaline earth metal compounds, organic tin compounds, etc.
(3) Antistatic agent; cation surfactants, anion surfactants, nonion surfactants, ampholytic surfactants, etc.
(4) Flame retardant; phosphoric acid esters, phosphoric acid ester halides, halides, inorganic materials, polyols containing phosphor, etc.
(5) Filler; alumina, kaolin, clay, calcium carbonate, mica, talc, titanium oxide, silica, etc.
(6) Reinforcing agent; glass lobing, metallic fiber, glass fiber, glass milled fiber, carbon fiber, etc.
(7) Coloring agent; inorganic pigments (Al, $Fe_2O_3$, $TiO_2$, ZnO, CdS etc.), organic pigments (carbon black, etc.), dyes, etc.
(8) Blowing agent; inorganic blowing agents (ammonium carbonate, sodium hydrogen carbonate), organic blowing agents (nitroso compounds, azo compounds) etc.
(9) Vulcanizing agent; vulcanization accelerator, acceleration assistant, etc.
(10) Deterioration preventing agent, ultraviolet absorber, antioxidant, metal deactivator, peroxide decomposing agent, etc.
(11) Coupling agent; silane compounds, titanium compounds, chromium compounds, aluminum compounds etc.
(12) Various thermoplastic resins, rubbers The packaging material of the invention is suitable for packaging silver halide photographic photosensitive materials, diazo photographic photosensitive materials, photosensitive resins, self-developing type photographic photosensitive materials and diffusion-transfer type photographic photosensitive materials.

Package form may be conventional and includes a single-sheet flat bag, a double-sheet flat bag, a square bottom bag, a self-standing bag, a single-sheet gusset bag, a double-sheet gusset bag, a film sheet, inner lining for a moistureproof box and a leader paper. The sealing form may also be conventional, and includes heat sealing, impulse heat sealing, supersonic welding and high frequency sealing. The methods of using an adhesive and a pressure sensitive adhesive may also be utilized.

By the above construction described heretofore, light-shielding and moistureproofness are secured, and physical strength such as tear strength and impact puncture strength are also secured sufficiently. Moreover, at the time of openning, this packaging material can easily be torn by hand without a notch. Cost of this packaging material is also inexpensive.

EXAMPLES

The packaging material of Example 1 corresponds to the embodiment illustrated in FIG. 1. Aluminum foil 3a 7 μm thick was laminated on an areal weight 60 g/m² of bleached kraft paper 4 through an extruded adhesive layer 5 of LDPE ("NOVATEC L-320", Mitsubishi Chemical Industries Ltd.) 13 μm thick. Polyethyleneimine was applied on the surface of the aluminum foil layer 3a, and dried to form an anchor coat layer 2. A light-shielding heat-sealable film layer 1a 40 μm thick of LDPE ("DFD-0111", Nippon Unicar Co., Ltd.) containing 0.07 wt. % of oleic acid amide lubricant and 3 wt. % of oil furnace carbon black was laminated thereon through an extruded adhesive layer 5 of LDPE ("MIRASON 14", Mitsui Polychemicals Co., Ltd.) 13 μm thick. Adhesive force (delamination resistance) between the aluminum foil layer 3a and the light-shielding heat-sealable film layer 1a was greater than 500 g/15 mm width.

The packaging material of Example 2 was the same the packaging material of Example 1 except that "MIRASON 14" was replaced by "NOVATEC L-320". Adhesive force between the aluminum foil layer 3a and the light-shielding heat-sealable film layer 1a was greater than 500 g/15 mm width.

The packaging material of Example 3 was the same as the packaging material of Example 2 except that the areal weight of the bleached kraft paper was changed from 60 g/m² to 50 g/m². Adhesive force between the aluminum foil layer 3a and the light-shielding heat-sealable film layer 1a was greater than 500 g/15 mm width.

Comparative packaging material 1 was the same as the packaging material of Example 2 except that the anchor coat layer 2 was not provided. Adhesive force between the aluminum foil layer 3a and the light-shielding heat-sealable film layer 1a was 215 g/15 mm width.

Figure 4:
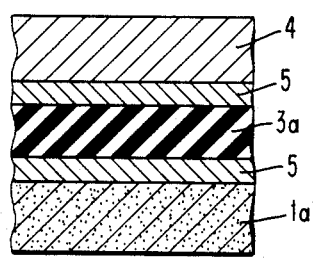
FIGS. 4 and 5 are sectional views of conventional packaging materials for photographic photosensitive materials.
Figure 5:
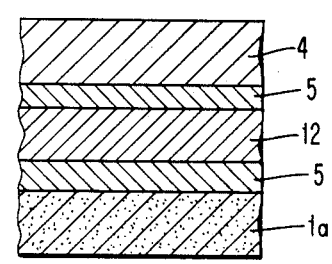

Conventional packaging material 1 corresponds to FIG. 4. Aluminum foil 3a 7 μm thick was laminated on an areal weight 35 g/m² of bleached kraft paper 4 through an extruded adhesive layer 5 of LDPE ("NOVATEC L-320") 13 μm thick, and a light-shielding LDPE ("DFD-0111", Nippon Unicar Co., Ltd.) layer 1a 70 μm thick containing 3 wt. % of oil furnace carbon black was further laminated thereon through an extruded adhesive layer 5 LDPE ("NOVATEC L-320") 13 μm thick. Adhesive force between the aluminum foil layer 3a and the light-shielding LDPE layer 1a was 168 g/15 mm width.

Various properties of the above packaging materials are tablated in Table 1.

In the above packaging materials, the following materials were employed;

LDPE of the heat-sealable film layer: "DFD-0111" (Nippon Unicar Co., Ltd.)
  MI: 2.4 g/10 minutes
  Density: 0.923 g/cm$^3$
Adhesive (LDPE) layer:
  "MIRASON 14" (Mitsui Polychemicals Co., Ltd.)
  MI: 5.1 g/10 minutes
  Density: 0.919 g/cm$^3$, or
  "NOVATEC L-320" (Mitsubishi chemical Industries Ltd.)
  MI: 7.0 g/10 minutes
  Density: 0.918 g/cm$^3$
Anchor coat layer: Polyethyleneimine ("EL-420", Toyo Morton, Ltd.)
Lubricant: Oleic acid amide lubricant "ARMOSLIP-CP" (Lion Akzo Co., Ltd.)
Carbon Brack: "#44B Oil furnace carbon black" (Mitsubishi Chemical Industries Ltd.)
  Mean particle size: 21 mμ, pH: 7.7 weighing 200 g. Another part of the sample was stuck on an inclined face, and the above block was placed on the face. The inclined angle was increased, and the angle ($\theta$) where the block began to slip was read. The coefficient is represented by tan $\theta$.

C. Light-Shielding Character;

A photographic film of ASA 100 was put into the bag made by each exemplified film, and then the bag was completely sealed. This bag was exposed to the light of 80,000 luxes for one hour, and the light-shielding character was estimated by the fogging degree of the photographic film.

D. Delamination Resistance;

Each exemplified film having 15 mm in width was partially delaminated between aluminum foil layer and heat-sealable film layer, and one delaminated terminal was fixed by a clip. Load was added to the other delamination resistance was the weight to begin delamination.

Figure 6:
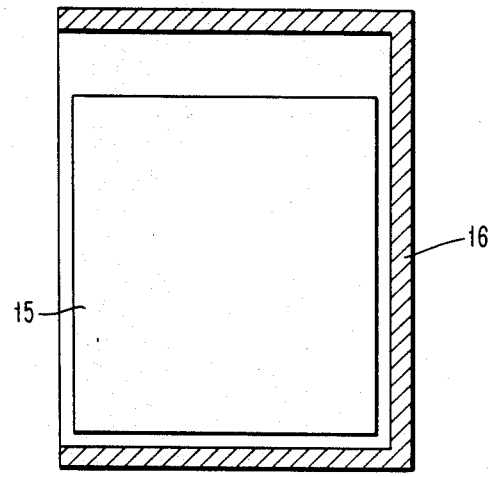
FIG. 6 is a plan view of a three-sided fin seal pouch formed by using a packaging material of the invention.
Figure 7:
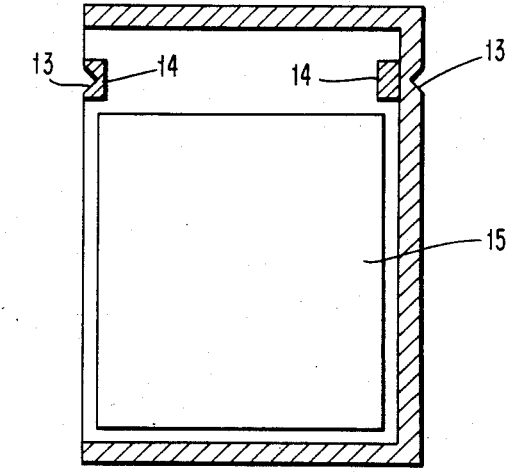
FIG. 7 is a plan view of a conventional three-sided fin seal pouch for packaging photographic photosensitive materials.

A three-sided fin seal pouch made by using the packaging material of the invention is shown in FIG. 6 16 indicates heat seal part, and no notch was provided to this pouch. Any part of this pouch could be torn by hand, and the photographic photosensitive materials 15 were easily removed.

I claim:

1. An easily openable packaging material for photographic photosensitive materials which comprises,
    a light-shielding heat-sealable film layer containing a lubricant, a light-shielding material and more than 50 wt. % of a high-pressure low-density polyethyl-

TABLE 1

|  | Unit | Invention 1 | Invention 2 | Invention 3 | Comparative | Conventional | Testing Method |
|---|---|---|---|---|---|---|---|
| Thickness | μm | 144 | 144 | 134 | 144 | 148 | JIS P-8118 |
| Tear Strength (MD) | g | 142 | 150 | 137 | 185 | 211 | JIS P-8116 |
| Tear Strength (CD) | " | 172 | 196 | 174 | 267 | 302 |  |
| Impact Puncture Strength |  |  |  |  |  |  |  |
| (Right Side) | kg · cm | 2.8 | 2.6 | 2.1 | 2.9 | 4.5 | JIS P-8134 |
| (Reverse Side) | " | 4.5 | 3.9 | 3.7 | 5.3 | 7.8 |  |
| Heat Seal Strength (170° C.) | kg/15 mm | 2.8 | 3.0 | 3.0 | 2.6 | 3.4 | A |
| Bursting Strength | kg/cm$^2$ | 3.3 | 3.2 | 2.9 | 2.7 | 2.5 | JIS P-8112 |
| Statical Friction Coefficient of Heat Seal Face |  | 0.270 | 0.284 | 0.259 | 0.289 | 0.498 | B |
| Water Vapor Transmission Rate | g/m$^2$ 24 hrs | 0.18> | " | " | " | " | JIS Z-0208 |
| Light-Shielding |  | A | A | A | A | A | C |
| Delamination Resistance | g/15 mm | 500> | 500> | 500> | 215 | 168 | D |
| Processing Aptitude |  | B | B | B | B | C | Tested by actual machine |
| Tearability of Three-Sided Fin Seal Pouch |  | B | B | A | D | E | Without Notch |
| Ratio of Cost |  | 80 | 80 | 77 | 78 | 100 |  |

Evaluations in Table 1 were carried out as follows:
A—very excellent, B—excellent C—practical, D—having a problem E—impractical Testing methods were as follows:
Density; JIS K 6760 (=ASTM D-1505)
Melt Index; JIS D 6760 (=ASTM 1238)
Thickness; JIS P 8118
Tear Strength; JIS P 8116

A. Heat Seal Strength;

Two sheets of exemplified film having 15 mm in width were superposed, and sealed by heat sealing at a prescribed temperature at 1 kg/cm$^2$ of sealing pressure for one second. After cooled completely, the weight necessary to release the seal at the pulling angle of 180 degrees was determined.

B. Statical Friction Coefficient of Heat Seal Face;

A part of the sample was cut off, and stuck on the underside of 75 mm length×35 mm width of a block ene resin and being located as the inner layer,
an aluminum foil layer which is laminated on said heat-sealable film layer with a delamination resistance of greater than 400 g/15 mm width and on the heat-sealable film layer side of which an anchor coat layer is formed, and
a heat-resistant flexible sheet layer which is laminated on said aluminum foil layer and of which heat resistance is higher than said heat-sealable film layer by 5° C. or more.

2. The packaging material of claim 1, wherein content of said lubricant is in the range of 0.01 to 1 wt. %.

3. The packaging material of claim 1, wherein static friction coefficient of said heat-sealable film layer is smaller than 0.364.

4. The packaging material of claim 1, wherein said lubricant is selected from a silicone lubricant, a fatty acid amide lubricant or a fatty acid lubricant.

5. The packaging material of claim 1, wherein said light-shielding material is metal powder or carbon black.

6. The packaging material of claim 1, wherein the thickness of said heat-sealable film layer is in the range of 20 to 70 μm.

7. The packaging material of claim 1, wherein the principal constituent of said anchor coat layer is polyethyleneimine.

8. The packaging material of claim 1, wherein said aluminum foil layer and/or said flexible sheet layer is laminated through an adhesive layer.

9. The packaging material of claim 1, wherein said flexible sheet layer is a member selected the group consisting of bleached kraft paper, synthetic paper, nonwoven fabric biaxially stretched polyester film and cellophane.

* * * * *